United States Patent
Levi et al.

(10) Patent No.: US 10,248,392 B2
(45) Date of Patent: Apr. 2, 2019

(54) REPLICATING A WEB TECHNOLOGY

(71) Applicant: HEWLETT PACKARD ENTERPRISE DEVELOPMENT LP, Houston, TX (US)

(72) Inventors: Elad Levi, Yehud (IL); Avigad Mizrahi, Yehud (IL); Ran Bar Zik, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 76 days.

(21) Appl. No.: 15/328,547

(22) PCT Filed: Aug. 8, 2014

(86) PCT No.: PCT/US2014/050258
§ 371 (c)(1),
(2) Date: Jan. 24, 2017

(87) PCT Pub. No.: WO2016/022137
PCT Pub. Date: Feb. 11, 2016

(65) Prior Publication Data
US 2017/0212735 A1    Jul. 27, 2017

(51) Int. Cl.
*G06F 8/36* (2018.01)
*G06F 11/34* (2006.01)
(Continued)

(52) U.S. Cl.
CPC ........... *G06F 8/36* (2013.01); *G06F 9/54* (2013.01); *G06F 9/546* (2013.01);
(Continued)

(58) Field of Classification Search
CPC ..... H04L 67/1095; H04L 67/34; H04L 67/42; G06F 8/36; G06F 9/546; G06F 9/54; G06F 9/547; G06F 2209/541; G06F 11/3476
(Continued)

(56) References Cited

U.S. PATENT DOCUMENTS 6,021,416 A  * 2/2000  Dauerer ............... G06F 17/24
                                                    707/999.004
7,698,256 B1    4/2010  Wang
(Continued)

FOREIGN PATENT DOCUMENTS

EP         2302509         3/2011

OTHER PUBLICATIONS

Honza, "Firebug, Web Development Evolved," (Web Page), Jun. 21, 2014, 17 pages, available at http://getfirebug.com/.
(Continued)

*Primary Examiner* — Marina Lee (57) ABSTRACT

In one example in accordance with the present disclosure, a system for replicating a web technology identifies asynchronous scripting code within isolated scripting code of the web technology. The isolated scripting code is part of larger client-side code of the web technology. The system executes the asynchronous scripting code to cause a request to be sent to a remote server and records the request. The system listens for return data received from the remote server in response to the request and saves the return data. The system generates mock server-side code based on the request and the return data.

20 Claims, 4 Drawing Sheets

(51) Int. Cl.
*G06F 9/54* (2006.01)
*H04L 29/08* (2006.01)
*H04L 29/06* (2006.01)

(52) U.S. Cl.
CPC .......... *H04L 67/1095* (2013.01); *H04L 67/34* (2013.01); *H04L 67/42* (2013.01); *G06F 9/547* (2013.01); *G06F 11/3476* (2013.01); *G06F 2209/541* (2013.01)

(58) Field of Classification Search
USPC ....................................................... 717/106
See application file for complete search history.

(56) References Cited

U.S. PATENT DOCUMENTS

| | | | |
|---|---|---|---|
| 8,099,787 B2 * | 1/2012 | Vasudeva | G06F 21/577 713/155 |
| 8,266,202 B1 | 9/2012 | Colton | |
| 8,352,903 B1 * | 1/2013 | Friedman | G06F 8/30 717/100 |
| 8,375,305 B1 | 2/2013 | Strand | |
| 8,429,604 B1 | 4/2013 | Blas et al. | |
| 8,463,874 B2 | 6/2013 | Nakamura | |
| 2003/0101152 A1 * | 5/2003 | Hicks | G06F 8/30 706/45 |
| 2004/0255163 A1 * | 12/2004 | Swimmer | G06F 21/552 726/24 |
| 2008/0071929 A1 | 3/2008 | Motte et al. | |
| 2009/0049553 A1 * | 2/2009 | Vasudeva | G06F 21/577 726/25 |
| 2011/0131273 A1 | 6/2011 | Merissert-Coffinieres et al. | |
| 2011/0302454 A1 | 12/2011 | Prophete | |
| 2012/0159307 A1 | 6/2012 | Chung et al. | |
| 2013/0290828 A1 | 10/2013 | Flake et al. | |
| 2013/0332732 A1 | 12/2013 | Kunin et al. | |
| 2014/0129924 A1 | 5/2014 | Le Bescond de Coatpont | |
| 2017/0212735 A1 * | 7/2017 | Levi | G06F 8/36 |

OTHER PUBLICATIONS

HTTrack, "HTTrack Website Copier," (Web Page), Jun. 8, 2014, 1 page, available at http://www.httrack.com/.

International Search Report & Written Opinion received in PCT Application No. PCT/US2014/050258, dated Apr. 22, 2015, 10 pages.

Kdzwinel, "SnappySnippet," Web Page), GitHub, Inc., Mar. 26, 2008, 3 pages, available at https://github.com/kdzwinel/SnappySnippet.

European Patent Office, Extended European Search Report for Appl. No. 14899278.7 dated Mar. 9, 2018 (13 pages).

* cited by examiner

REPLICATING A WEB TECHNOLOGY

BACKGROUND

Various web technologies exist that allow users to access and interact with various aspects of the web technology by executing client-side code using software programs, operating systems or the like running on the users' devices. Examples of such web technologies include interactive webpages and mobile applications. When a user's device executes client-side code for the web technology, this may cause the web technology to communicate with a remote server. The remote server may store, as a component of the web technology, additional server-side code. This server side code may execute or run on the remote server and may perform certain routines when it receives requests or instructions from the user's device. The remote server may, in some situations, send return data to the user's device in response to the request. Generally, the client-side code of a web technology is accessible by the user's device, whereas the server-side code is not accessible.

BRIEF DESCRIPTION OF THE DRAWINGS

The following detailed description references the drawings, wherein.

DETAILED DESCRIPTION

The various web technologies mentioned above may be created by developers (i.e., web developers). Many web technologies are highly complex and require many hours of a developer's (or team of developers) time to create, test and debug. In some situations, it is useful if developers can replicate portions of an existing web technology. In some situations, if a developer wants to replicate such a web technology, the developer re-engineers the web technology or portion of the web technology from scratch, or perhaps from a template. In some situations, the developer may have access to part or all of the client-side coda of the web technology. But even if the developer has access to such templates or client-side code, it may be tedious work to replicate the web technology, especially if the developer is only interested in a portion of the web technology (e.g., a particular widget of a webpage).

Some solutions allow developers to download the client-side code of a web technology; however, such solutions only allow developers to download the client-side code of the entire web technology (e.g., an entire webpage). They do not allow web developers to extract code of just a portion of the web technology (e.g., a single widget or a single selected area). When a developer is provided with client-side code of an entire web technology, a developer may still be required to expend significant effort to isolate client-side code for just a desired portion of the web technology. For example, the developer may have to identify the HTML code for the desired portion and then determine the related CSS code, JavaScript code and potentially other auxiliary code. Some solutions allow developers to identify some auxiliary code that is related to particular HTML elements; however, such solutions do not allow developers to extract all the required CSS code, JavaScript code and the like that are required to fully display and execute a selected portion of the web technology. Additionally, none of these solutions allow developers to access, replicate or generate any server-side code for the web technology.

The present disclosure describes replicating a web technology. The solutions of the present disclosure may allow a developer to replicate portions of or all of the client-side functionality of an existing web technology. For example, a developer may be able to select a visual or graphical region displayable by the web technology and the solutions of the present disclosure may isolate client-side code (e.g., base web code, style and formatting code, scripting code, etc.) related to the selected region or portion. Additionally, the solutions of the present disclosure may mock server-side code of the web technology that is not accessible by the developer (i.e., by the developer's computing device or system). According to the present disclosure, various pieces of client-side code may be executed that cause communication with a remote server and data that is sent to and received from the remote server may be analyzed and used to automatically create mock server-side code. Then, the isolated client-side code and the mock server-side code may be packaged to create a fully displayable and executable web technology that relates to the selected visual or graphical region.

The solutions of the present disclosure may allow a developer to drastically simplify the task of replicating portions of or all of an existing web technology. With these solutions, a developer may leverage previous client-side work and may also receive automatically-generated server-side code that is needed to enable various functionalities of the web technology. Thus, the solutions of the present disclosure may drastically improve the timeframe from development to value.

Various descriptions of the present disclosure focus on an interactive webpage as an example of a web technology. However, it should be understood that the solutions described herein may apply equally to various other web technologies as well for example, mobile applications. Various descriptions of the present disclosure focus on providing client-side and server-side code for a selected visual or graphical region displayable by the web technology. For example, as described in more detail below, a user could select a widget of a larger webpage. A widget is a part of a webpage that can be conceptually or functionally separated from the larger webpage, for example, a news bar, contact form, information box, etc. This example of a selected visual or graphical region may be an important example, but it should be understood that in other examples of the present disclosure, an entire displayable page of the web technology may be used instead of a smaller region or portion. In yet other examples, multiple entire pages of the web technology may be used, thereby helping to recreate an entire web technology.

Figure 1:
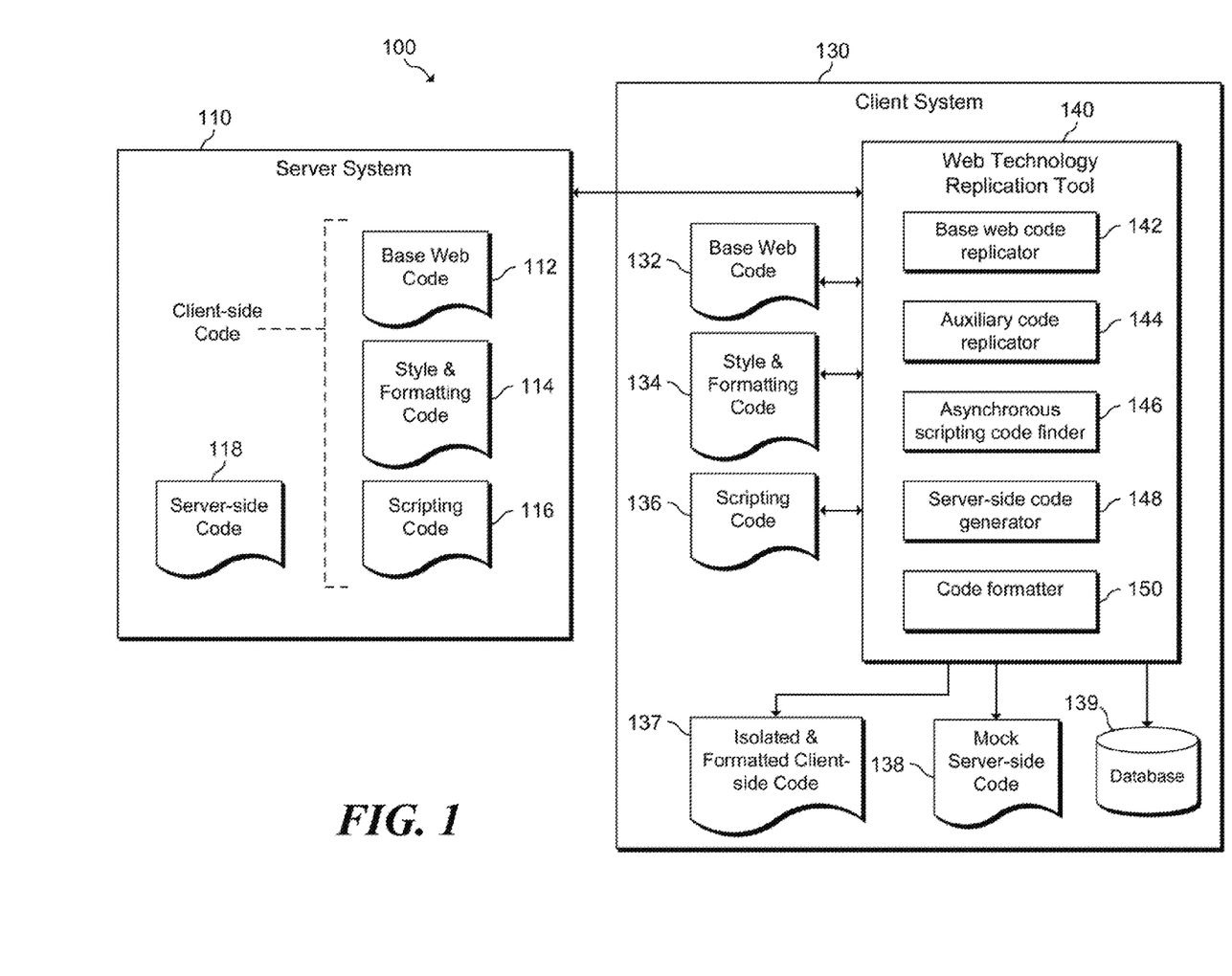
FIG. 1 is a block diagram of an example computing environment in which replicating a web technology may be useful.

FIG. 1 is a block diagram of en example computing environment 100 in which replicating a web technology may be useful. Computing environment 100 may include a server system 110 and a client system 130. Client system 130 may communicate with server system 110 over at least one network. In other words, server system 110 may be remote to and accessible by client system 130 over the at least one network. In this situation, the mentioned network may be any wired or wireless network, and may include any number of hubs, routers, switches, cell towers or the like. Such a network may be, for example, part of a cellular network, part of the internet, part of an intranet and/or other type of network.

Server system 110 may include at least one computing device that is capable of communicating with at least one client computing device or system, for example, client system 130. The term "system" may be used to refer to a single computing device or multiple computing devices that communicate with each other (e.g., via a network) and operate together to provide a unified service. Server system 110 may store code for a web technology, for example, an interactive webpage or website, a mobile application or the like. The code of the web technology may include multiple code files, which when executed at various times, may work together to provide the functionality that is the web technology.

The code of the web technology may include a number of client-side code files (e.g., 112, 114, 116), or simply referred to collectively as client-side code. The client-side code, as its name suggests, may be accessible by at least one client (e.g., client system 130), for example, over a network. The client-side code files for the web technology may include at least one base web code file, collectively referred to as base web code 12. These base web code files may be written in web based programming language such as HTML (HyperText Markup Language). HTML is a standard markup language used to create web pages. It may be used to create the main building blocks or base of a webpage, for example.

The client side code files for the web technology may include at least one style and formatting code file, collectively referred to as style and formatting code 114. These style and formatting code files may be referenced by the base web code 112 and may provide visually interesting formatting to items (e.g., menu bars, tables, fonts, etc.) that display when a client system executes the client-side code. These style and formatting code files may be written in a formatting language such as CSS (Cascading Style Sheets). CSS is a style sheet language used for describing the look and formatting of a document written in a markup language such as HTML. It may be used to determine the "look and feel" of HTML elements, for example.

The client side code files for the web technology may include at least one scripting code file, collectively referred to as scripting code 116. These scripting code flies may be referenced by the base web code 112 and may provide additional or dynamic logic to the web technology when a client system executes the client-side code. These scripting code files may be written in a scripting language such as JavaScript (JS). JavaScript is a dynamic computer programming language that is commonly used for webpages that use client-side scripts to interact with users. JavaScript may, in effect, determine the behavior of the webpage, for example, opening and closing menus and items, animations, requesting information (e.g., from a remote servers) without reloading the page, etc. In some examples where the web technology is a native mobile app, the client side code may be written in a language executable by a mobile operating system. In some examples, the client side code may not be actually divided into the precise separate files or groups of files (e.g., 112, 114, 116) shown in FIG. 1 and, instead, some or all of this code may be located in at least one common file. Still, there may be portions of code that are essentially base web code, style & formatting code and scripting code.

The code of the web technology may include a number of server-side code files, or simply referred to collectively as server-side code 118. The server-side code, as its name suggests, may not be accessible by clients (e.g., client system 130). In other words, access restrictions may prevent client system 130 from accessing server-side code 118. The server-side code for the web technology may execute or run on the server system and may perform certain routines when it receives requests or instructions from a client system that is executing the client side code. As one specific example, the server-side code may perform operations (e.g., read, write, create, delete) on a database. The server-side code may, in some situations, send return data to the client system in response to the request.

Client system 130 may include at least one computing device that is capable of communicating with at least one server device or system, for example, server system 110. The term "system" may be used to refer to a single computing device or multiple computing devices that communicate with each other (e.g., via a network) and operate together to provide a unified service. Client system 130 may include a manner to access and download client-side code (e.g., 112, 114, 116) of the web technology from server system 110, and save it locally on the client system 130, e.g., as code 132, 134, 138. Such a client-side code download may be performed by a web browser (e.g., running in full user mode, or a "headless" mode), by lower level web based access commands (e.g., similar to those used by web browsers), or by a mobile application download tool such as an app store.

Client system 130 may include a web technology replication tool 140. Web technology replication tool 140 may replicate portions of or all of the client-side functionality of the web technology. Additionally, web technology replication tool 140 may mock server-side code of the web technology that is not accessible by the client system 130.

Web technology replication tool 140 may, as is shown in FIG. 1, access and download client-side code (e.g., 112, 114, 116) of the web technology from server system 110. Web technology replication tool 140 may do this download directly (e.g., via lower level web based access commands similar to those used by web browsers), or it may do it via communication with a web browser (e.g., running in full user mode, or a "headless" mode) or via communication with a mobile application download tool such as an app store. Thus, in some examples, web technology replication tool 140 may be a standalone tool, and in other examples, it may be a component of a different tool such as a web browser. In one specific example, web technology replication tool 140 may be a "plugin" or "extension" installed as part of a web browser.

Web technology replication tool 140 may, at various times, execute or run the locally-saved client-side code (e.g., 132, 134, 136) of the web technology or execute/run just a portion of the client-side code. Web technology replication tool 140 may do this execution directly (e.g., using commands similar to those used by web browsers), or it may do it via communication with a web browser (e.g., running in full user mode, or a "headless" mode), or in the situation of a native mobile application, via communication with a mobile operating system.

Web technology replication tool 140 may include a base web code replicator 142, an auxiliary code replicator 144, an asynchronous scripting code finder 146, a server-side code generator 148 and a code formatter 150. Each of these components and web technology replication tool 140 in general may each include instructions (e.g., stored an a machine-readable storage medium of system 130) that, when executed (e.g., by a processor of system 130), implement the functionality of web technology replication tool 140. Alternatively or in addition, web technology replication tool 140 may include electronic circuitry (i.e., hardware) that implements the functionality of web technology replication tool 140.

Base web code replicator 142 may access base web code 132 and identify a portion of this code that is relevant to a specification of a user (e.g., a developer) of the web technology replication tool 140. For example, base web code replicator 142 may identify a portion of this code that relates to a selected visual or graphical region. Base web code replicator 142 may allow the user to select said visual or graphical region. For example, base web code replicator 142 may display (e.g., directly or via a web browser or other viewer) a page of the web technology to the user. Then, base web code replicator 142 may provide a graphical user interface (GUI) that allows the user to select a region of the displayed content. As one specific example, base web code replicator 142 may be a plugin of a web browser, and the plugin may allow the user to interact with the displayed content "over top" of the displayed content, e.g., by moving a pointer to one point on the displayed content and dragging or drawing to indicate a region of the displayed content. In the end, one example output of this region selection may be a set of X-Y coordinates that define a geometric region (e.g., a rectangle) where a corner (e.g., upper left corner) of the displayable screen is the 0-0 axis. As another example, a region may be defined by a starting X-Y coordinate and then a width and height (e.g., in pixels) of the region.

Once a region of the displayed content is indicated (e.g., with X-Y coordinates, widths, heights, etc.), base web code replicator 142 may identify a portion of base web code 132 that is related to the indicated region. In some examples, base web code replicator 142 may identify HTML code or HTML elements that are related to the indicated region. In order to identify the code related to the indicated region, base web code replicator 142 may access and analyze the DOM structure. A DOM (Document Object Model) structure is a convention for representing and interacting with web objects, e.g., created based on various HTML elements. The DOM may be generated when a web browser or other viewer executes the client-side code. Once base web code replicator 142 accesses the DOM structure it may analyze the DOM structure to identify regions that relate to the regions selected by the user. DOM structures may include X-Y coordinate information or other page placement information that indicates where various web elements (e.g., HTML elements) get placed when the client-side code is executed. By analyzing this information, base web code replicator 142 may associate various web elements (e.g., HTML elements) in base web code 132 with the region selected by the user.

Base web code replicator 142 may save or record the portions (e.g., HTML elements) of base web code 132 that are identified by analyzing the user selected region and the DOM structure. These identified portions may be referred to as isolated based web code. This isolated base web code may be saved (e.g., temporarily) in a volatile memory (e.g., system memory) of client system 130 or it may be stored in a non-volatile storage device, for example, as a separate code file stored on a machine-readable storage medium of system 130.

Auxiliary code replicator 144 may access style & formatting code 134 and scripting code 136 and identify portions of this code that are relevant to the isolated base web code 132 discussed above. Style & formatting code 134 and scripting code 136 may be referred to collectively as "auxiliary code," meaning it is in addition to base web code 132. In some examples, auxiliary code replicator 144 may access and analyze other types of auxiliary code than just style & formatting code and scripting code, but these types of auxiliary code will be used in the examples herein.

Auxiliary code replicator 144 may access the isolated base web code (e.g., the included HTML elements or HTML code) and may use this information to scan style & formatting code 134 and scripting code 136 for portions that are related to the isolated base web code. Here, "related to" means that the auxiliary code is either required to support the desired look and feel (in the case of style & formatting code) or desired functionality (in the case of scripting code) of the isolated base web code. Thus, the related auxiliary code is closely associated with the isolated base web code, as opposed to all the auxiliary code in the client-side code. It may be the case that the isolated HTML elements are linked to various portions of code in the auxiliary code files via tags, labels or the like. Thus, in the case of style & formatting code 134 (e.g., CSS code), auxiliary code replicator 144 may reference tags, labels or the like of various HTML elements and then scan style & formatting code 134 to find related code, for example, CSS selectors and related attributes. Similarly, in the case of scripting code 136 (e.g., JavaScript code), auxiliary code replicator 144 may reference tags, labels or the like of various HTML elements and then scan scripting code 136 to find related code, for example, JavaScript code that operates on the various HTML elements.

Auxiliary code replicator 144 may save or record the portions of the auxiliary code that are identified as being related to the isolated base web code, as just described. These identified portions may be referred to as isolated auxiliary code, or separately, isolated style & formatting code and isolated scripting code. This isolated auxiliary code may be saved (e.g., temporarily) in a volatile memory (e.g., system memory) of client system 130 or it may be stored in a non-volatile storage device, for example, as at least one separate code file stored on a machine-readable storage medium of system 130.

Asynchronous scripting code finder 146 may analyze the isolated scripting code mentioned above to identify any included asynchronous scripting code. Asynchronous scripting code finder 146 mould also analyze the full scripting code 136, but the examples provided herein describe analyzing the isolated scripting code, for example, as it is stored temporarily in volatile memory.

As a subset of the total, the isolated scripting code may include various code portions that are referred to as "asynchronous scripting code." Asynchronous scripting code is scripting code that can be interpreted (e.g., by a web browser or other viewer) to get information from a remote server without reloading a page that is currently being displayed by the web technology. One example of asynchronous scripting code is AJAX (Asynchronous JavaScript and XML). The present disclosure also contemplated other types of asynchronous scripting code. Finding the asynchronous scripting code may be useful to the solutions of the present disclosure because asynchronous scripting code may contact a remote server (e.g., such as server system 110) and may cause interaction with server-side code (e.g., 118) on the remote server. Thus, finding this asynchronous scripting code may be a key to determining what data is exchanged with the server side code, and thus may be a key to mocking the server side code.

Asynchronous scripting code finder 146 may find asynchronous scripting code by analyzing the isolated scripting code, e.g., using static code analysis. In this example, asynchronous scripting code finder 146 may look for known code patterns (e.g., stored in a knowledgebase accessible by client system 130) that inchoate that the code is asynchronous scripting code. Table 1 below shows two examples of common AJAX calls, and it may be seen that the formatting of these calls follow a pattern that may be recognized by Asynchronous scripting code finder 146.

TABLE 1

| AJAX Code Examples | |
|---|---|
| Example 1 | $( "#b" ).load("http://myapp/services/data"); |
| Example 2 | $http.get("http://myapp/services/data") |

Referring to Table Example 1 shows an AJAX call that uses jQuery. jQuery is a library of JavaScript functions used for client-side scripting. In this example, the AJAX call is performing a "load" function and directing whatever data is received in response to a variable called "b." The provided URL in this example indicates where the data is being requested from. For example, "myapp" may resolve to a server location, and "services" may be a directory or set of data, and "data" may be a sub-directory or sub-set of the data in the services set. Thus, the AJAX call of Example 1 may request this sub-set of data from the remote server. Asynchronous scripting code finder 146 may detect a scripting call like the one of Example 1, for example, by recognizing the format of the call, including keywords such as "load." Asynchronous scripting code finder 146 may detect various other types of jQuery calls as well, including calls that send or put data to the remote server for storage, calls that update data at the remote sever, calls that delete data at the remote server, etc. In some examples, these calls may cause the server-side code at the remote server to perform various operations on a database that stores the data that is sent to the remote server and requested from the remote server.

Example 2 of Table 1 shows an AJAX call that uses AngularJS. Like jQuery, AngularJS is a library of JavaScript functions used for client-side scripting. In this example, the AJAX call is performing a "get" function. The indicated URL in this example servers a similar purpose as in Example 1. Thus, the AJAX call of Example 2 may request data from the remote server. Asynchronous scripting code finder 146 may detect a scripting call like the one of Example 2, for example, by recognizing the format of the call, including keywords such as "get." Asynchronous scripting code finder 146 may detect various other types of AngularJS calls as well, including calls that update, data at the remote server, calls that delete data at the remote server, etc.

As an alternative to looking for known code patterns, as described above, asynchronous scripting code finder 146 may find asynchronous scripting code by executing some or all of the isolated scripting code and then sniffing the network connection between the client system 130 and the server system 110 (e.g., a "man in the middle" approach). While sniffing this network connection, asynchronous scripting code finder 146 may detect various operations that are known to be asynchronous scripting code operations, for example, commands that communicate with a remote server such as get commands, post commands, put commands and the like.

Asynchronous scripting code finder 146 may save or record the portions of the isolated scripting code that are asynchronous scripting code. These identified portions may be referred to as isolated asynchronous scripting code.

Server-side code generator 148 may mock server-side code 118 of the web technology that is not accessible by the client system 130. The term "mock" may be used herein to mean replicate the functionality to a certain extent. It may be difficult or impossible for server-side code generator 148 to determine the exact makeup of server-side code 118 because of access restrictions. However, the solutions provided herein may describe creating a server-side code framework or skeleton that can respond to asynchronous scripting code calls. Such a framework or skeleton may be able to handle sent and received data in the correct data format. Such a framework or skeleton may be elaborated and improved over time.

Server-side code generator 148 may start by executing or activating the isolated asynchronous scripting code mentioned above. This may include executing or activating a number of included asynchronous scripting code calls such as AJAX calls. Some calls may cause data to be sent to server system 100. Some calls may cause server-side code 118 to perform various routines. Some calls may cause server system 100 to send return data to client system 130. Server-side code generator 148 may listen for return data. Server-side code generator 148 may analyze (e.g., in real time) asynchronous scripting code calls that are made and may analyze (e.g., in real time) any data that is sent to and/or received from the remote server. Server-side code generator 148 may use this information to automatically generate mock server-side code.

Table 2 below shows an example of how mock server-side code may be created by analyzing an asynchronous scripting code call and analyzing return data sent back from the remote server in response to the call.

TABLE 2

| | | Example of Creating Mock Server-side Code |
|---|---|---|
| 1 | Recorded Request | HTTP Operation Get : http://myapp/services/data<br>HTTP Response type : Appication/JSON |
| 2 | Recorded Response | [<br>{"region":"valore","price":"valore2"},<br>{"region":"valore","price":"valore2"},<br>{"region":"valore","price":"valore2"}<br>] |
| 3 | Generated Mock Server-side Code | <?php<br>Function get_data( ) {<br>    If(arg(0) == 'services' && arg(1) ==<br>    'data') {<br>      $arr = array(<br>  array(<br>    "region" => "valore",<br>    "price" => "valore2"<br>  ),<br>  array(<br>    "region" => "valore",<br>    "price" => "valore2"<br>  ),<br>  array(<br>    "region" => "valore",<br>    "price" => "valore2"<br>  )<br>);<br>      echo json_encode($arr);<br>    )<br>}<br>?> |

Referring to Table 2, it can be seen that row 1 shows request data that, client system 130 sent to server system 110 as a result of a "get" type asynchronous scripting code call. Server-side code generator 148 may have detected and recorded this request data after activating or executing the related call. Next, e.g., after some time, server-side code generator 148 may have detected and recorded the recorded response shown in row 1 of Table 2. The response may have been sent by server system 110 in response to the request of row 1. The response may include return data, as shown in row 2. In the example of Table 2, the return data is formatted as an array with three elements (see the 3 rows of the response), each element having two fields (e.g., region, price) and a value for each field (e.g., valore, valore2, respectively). In this example, each element of return data is identical, but this need not be the case.

Server-side code generator 148 may focus on ensuring that the data type and data formatting is correct. By understanding the data types, server-side code generator 148 may interpret the return data of the response from the remote server, and it may likewise be able to generate mock server-side code that follows the same format. In the example of Table 2, the format of the data may be determined by analyzing the request data (e.g., row 1 of Table 2). It can be seen that the "response type" is "JSON" in this example. JSON (JavaScript Object Notation) is an open standard format or markup language that uses human-readable text to format data, e.g., as attribute-value pairs. Other types of formatting may be used as well, for example, XML. Continuing with the example of Table 2, once server-side code generator 148 detects that the JSON data format is being used, it can then understand the return data of the recorded response of row 2, which is also formatted in the JSON format.

Looking again to Table 2, once server-side code generator 148 records the request of row 1 and the response of row 2, and once it knows the format of the data, it can automatically create mock server-side code (row 3). The mock server-side code is essentially a server response to the recorded request, and can be used to respond to a similar request in the future. In the example of Table 2, the mock server-side code is generated in a PHP coding language. Other coding languages can be used, and the coding language may be selected by the developer. In the example of Table 2, it can be seen that the mock server-side code may essentially be generated as an IF X, THEN Y format, where the IF clause detects where the data is being requested from (e.g., from the "services" data set and the "data" sub-set) and the THEN clause provides the associated return data. It can be seen that the data provided in row 3 is the same data that was seen in the response of row 2. Thus, it can be seen that generating the mock server-side code may include generating logic that provides the return data when presented with a request similar to the sent request. In other words, the logic may mimic the response of the remote server when it is presented with the request. Additionally, the "echo" command in row 3 encodes the return data in the correct format (e.g., the JSON format for this example).

Server-side code generator 148 may store return data seen while executing various asynchronous scripting calls, so that the same data can be returned by the generated mock code when it handles a similar request in the future. In the example of Table 2, an example of this return data can be seen in row 2. This return data may be stored directly as part of the generated mock code, as is shown in row 3. Alternatively, data may be stored in a database (e.g., database 139) maintained by web technology replication tool 140. Then, when the mock server-side code is executed later to handle a request, it may access the database to return the appropriate data. Regardless of how this return data is stored, server-side code generator 148 may maintain, grow and refine a knowledgebase of data to handle various situations or requests. This knowledgebase may include multiple request types and multiple related pieces of return data. This knowledgebase may be populated by executing and analyzing the sent/received data for venous asynchronous scripting calls. Refining the knowledgebase may include, at any time, combining a current recorded request and associated return data received from the remote server with previously recorded requests and previously received return data. Thus, the more calls that server-side code generator 148 executes and analyzes, the more requests and return data the knowledgebase includes, and the smarter the mock server-side code may become. The smarter the mock server-side code becomes, the more situations or requests the mock server-side code may be able to handle. And because the growth and refinement of this knowledgebase and mock server-side code is automatic, a developer may easily create a workable server-side code base that may be used to fully display and execute the web technology even if server-side code 118 is removed or deleted at some point.

Code formatter 150 may format and output and/or package various code files. Code formatter 150 may format and output the isolated client-side code described above, for example, the isolated base web code, the isolated style and formatting code and the isolated scripting code. Code formatter 150 may output the isolated client-side code as at least one code file generally noted as isolated and formatted client-side code 137 in FIG. 1. Code formatter 150 may format this at least one file, for example, such that they may be read, understood and executed as particular types of code files. For example, header or footer information may be added to the file. Code formatter 150 may format and output the mock server-side code as at least one code file generally noted as mock server-side code 138 in FIG. 1. Code formatter 150 may format this one or more file in a similar manner that just described.

Figure 2:
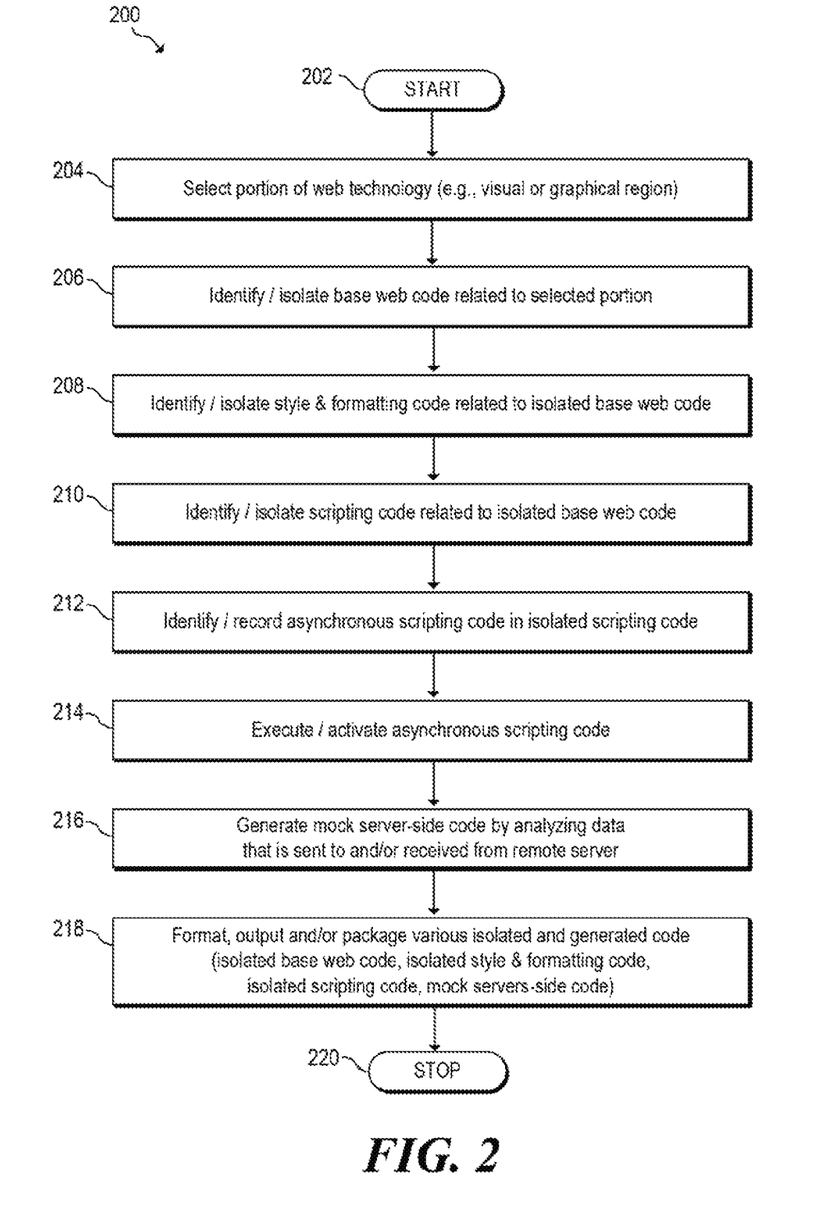
FIG. 2 is a flowchart of an example method for replicating a web technology.

FIG. 2 is a flowchart of an example method 200 for replicating a web technology. Method 200 may be described below as being executed or performed by a system, for example, client system 130 of FIG. 1. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat.

Method 200 may start at step 202 and continue to step 204, where the system may select (e.g., via base web code replicator 142) a portion of a web technology, for example, allowing a user to use a provided GUI to select a visual or graphical region, as described in more detail above. At step 206, the system may identify and/or isolate (e.g., via base web code replicator 142) base web code related to the selected portion, as described in more detail above. At step 208, the system may identify and/or isolate (e.g., via auxiliary code replicator 144) style and formatting code related to the isolated base web code, as described in more detail above. At step 210, the system may identify and/or isolate (e.g., using auxiliary code replicator 144) scripting code related to the isolated base web code, as described in more detail above. At step 212, the system may identify and/or record (e.g., via asynchronous scripting code finer 146) asynchronous scripting code (included in the isolated scripting code), as described in more detail above. At step 214, the system may execute and/or activate (e.g., using server-side code generator 148) the asynchronous scripting code, as described in more detail above. At step 216, the system may generate (e.g., using server-side code generator 148) mock server-side code by analyzing data that is sent to and/or received from a remote server, as described in more detail above. At step 218, they system may format, output and/or package various isolated and generated code (e.g., isolated base web code, isolated style & formatting code, isolated scripting code, mock servers-side code), as described in more detail above. Method 200 may eventually continue to step 220, where method 200 may stop.

Figure 3:
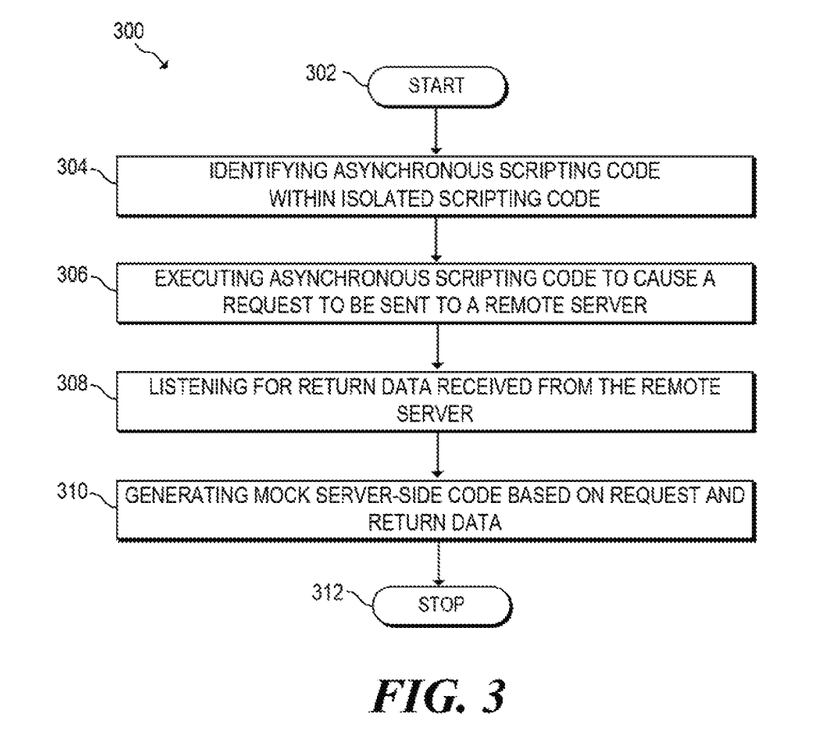
FIG. 3 is a flowchart of an example method for replicating a web technology.

FIG. 3 is a flowchart of an example method 300 for replicating a web technology. Method 300 may be described below as being executed or performed by a system, for example, client system 130 of FIG. 1, system 400 of FIG. 4 or system 500 of FIG. 5. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the system may identify asynchronous scripting code within isolated scripting code of a web technology. The isolated scripting code is part of larger client-side code of the web technology. At step 306, the system may execute the asynchronous scripting code to cause a request to be sent to a remote server and recording the request. At step 308, the system may listen for return date received from the remote server in response to the request and saving the return data. At step 310, the system may generate mock server-side code based on the request and the return data. Method 300 may eventually continue to step 312, where method 300 may stop.

Figure 4:
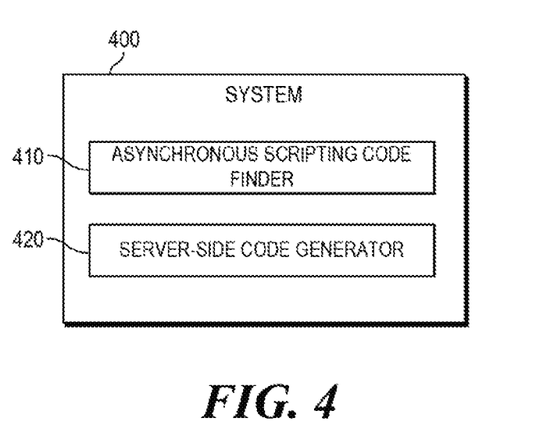
FIG. 4 is a block diagram of an example system for replicating a web technology.

FIG. 4 is a block diagram of an example system 400 for replicating a web technology. System 400 may include at least one computing device that is capable of communicating with at least one remote server, for example, server system 110 of FIG. 1. System 400 may be similar to client system 130 of FIG. 1. In the embodiment of FIG. 4, system 400 includes an asynchronous scripting code finder 410 and a server-side code generator 420. Asynchronous scripting code finder 410 may be similar to asynchronous scripting code finder 146 of FIG. 1. Asynchronous scripting code finder 410 may identify asynchronous scripting code within isolated scripting code of a web technology. The isolated scripting code is part of larger client-side code of the web technology. Asynchronous scripting code finder 410 may be implemented in the form of executable instructions stored on at least one machine-readable storage medium of system 400 and executed by at least one processor of system 400. Alternatively or in addition, asynchronous scripting code finder 410 may be implemented in the form of one or more hardware devices including electronic circuitry for implementing the functionality of asynchronous scripting code finder 410.

Server-side code generator 420 may be similar to sever-side code generator 148 of FIG. 1. Server-side code generator 420 may execute the asynchronous scripting code to cause a request to be sent to a remote server and may record the request. Server-side code generator 420 may listen for return data received from the remote server in response to the request and may save the return data. Server-side code generator 420 may generate mock server-side code based on the request and the return data. The mock server-side code may include logic that mimics a response of the remote server when it is presented with the request. Server-side code generator 420 may be implemented in the form of executable instructions stored on at least one machine-readable storage medium of system 400 and executed by at least one processor of system 400. Alternatively or in addition, server-side code generator 420 may be implemented in the form of one or more hardware devices including electronic circuitry for implementing the functionality of server-side code generator 420.

Figure 5:
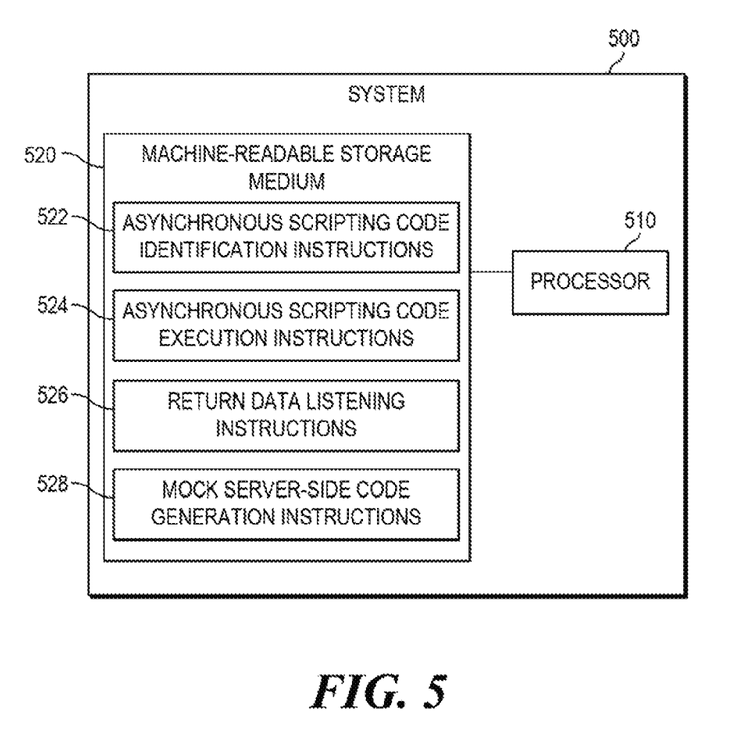
FIG. 5 is a block diagram of an example system for replicating a web technology.

FIG. 5 is a block diagram of an example system 500 for replicating a web technology. System 500 may include at least one computing device that is capable of communicating with at least one remote server, for example, server system 110 of FIG. 1. System 500 may be similar to client system 130 of FIG. 1. In the embodiment of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by across multiple processors.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526, 528 to replicate a web technology. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for replicating a web technology.

Referring to FIG. 5, asynchronous scripting code identification instructions 522, when executed by a processor (e.g., 510), may cause system 500 to identify asynchronous scripting code within isolated scripting code of the web technology. The isolated scripting code is part of larger client-side code of the web technology. Asynchronous scripting code execution instructions 524, when executed by a processor (e.g., 510), may cause system 500 to execute the asynchronous scripting code to cause a request to be sent to a remote server, and may cause system 500 to record the request including an expected return data format that is part of the request. Return data listening instructions 526, when executed by a processor (e.g., 510), may cause system 500 to listen for return data received from the remote server in response to the request and saving the return data. Saving the return data may include interpreting the return data according to the return data format. Mock server-side code generation instructions 528, when executed by a processor (e.g., 510), may cause system 500 to automatically generate mock server-side code based on the request and the return data.

The invention claimed is:

1. A method for replicating a web technology, the method comprising:
   identifying asynchronous scripting code within isolated scripting code of the web technology, the isolated scripting code being part of larger client-side code of the web technology;
   executing the asynchronous scripting code to cause a request to be sent to a remote server and recording the request;
   listening for return data received from the remote server in response to the request and saving the return data; and
   generating mock server-side code based on the request and the return data.

2. The method of claim 1, wherein recording the request includes recording an expected return data format indicated by an indicator in the request, wherein the return data is expected to be in this format.

3. The method of claim 2, wherein saving the return data includes interpreting the return data according to the return data format, and saving the return data according to the return data format.

4. The method of claim 1, wherein generating the mock server-side code includes generating logic that provides the return data when presented with a request similar to the sent request.

5. The method of claim 1, wherein generating the mock server-side code includes using the recorded request and the return data received from the remote server to refine a knowledgebase of multiple request types and multiple related pieces of return data.

6. The method of claim 1, wherein identifying the asynchronous scripting code includes looking for a predefined code pattern that indicates that code is asynchronous scripting code.

7. The method of claim 1, further comprising:
   receiving, by a system comprising a hardware processor, information of a user-selected region of a graphical user interface (GUI) of the web technology;
   identifying isolated base web code associated with the user-selected region, the isolated base web code being part of a larger base web code of the web technology; and
   identifying the isolated scripting code by determining that the isolated scripting code is required to support functionality of the isolated base web code, wherein the isolated scripting code is part of a larger scripting code associated with the larger base web code.

8. The method of claim 7, wherein determining that the isolated scripting code is required to support functionality of the isolated base web code includes identifying a tag or label that links the isolated scripting code and the isolated base web code.

9. The method of claim 7, further comprising identifying isolated style and formatting code by determining that the isolated style and formatting code is required to support a target look and feel of the isolated base web code.

10. The method of claim 7, wherein the GUI defines the user-selected region by at least one set of X-Y coordinates that defines a geometric region.

11. A system for replicating a web technology, the system comprising:
    a processor; and
    a non-transitory storage medium storing instructions executable on the processor to:
       receive information of a user-selected region of a graphical user interface (GUI) of the web technology;
       identify, based on the information of the user-selected region of the GUI, an isolated base web code that is related to the user-selected region of the GUI, the isolated base web code part of a larger base web code;
       identify isolated scripting code linked to the isolated base web code;
       identify asynchronous scripting code within the isolated scripting code, the isolated scripting code being part of larger scripting code of the web technology;
       execute the asynchronous scripting code to cause a request to be sent to a remote server, and recording the request;
       receive return data from the remote server in response to the request, and saving the return data; and
       generate mock server-side code based on the request and the return data, wherein the mock server-side code includes logic that mimics a response of the remote server when the remote server is presented with the request.

12. The system of claim 11, wherein the instructions are executable on the processor to generate the mock server-side code by using the recorded request and the recorded return data received from the remote server to refine a knowledgebase of multiple request types and multiple related pieces of return data that are responsive to the multiple request types.

13. The system of claim 12, wherein the instructions are executable on the processor to refine the knowledgebase by combining the recorded request and the recorded return data received from the remote server with previously recorded requests and previously received return data.

14. A non-transitory machine-readable storage medium encoded with instructions for replicating a web technology, the instructions upon execution causing a system to:
    receive information of a user-selected region of a graphical user interface (GUI) of the web technology;
    identify asynchronous scripting code within isolated scripting code of the web technology, the isolated scripting code being part of larger scripting code of the web technology, and the isolated scripting code to provide user interactivity of the user-selected region of the GUI;

execute the asynchronous scripting code to cause a request to be sent to a remote server, and recording the request including an expected return data format specified by an indicator in the request;

listen for return data received from the remote server in response to the request, and saving the return data, wherein saving the return data includes interpreting the return data according to the expected return data format; and automatically generate mock server-side code based on the request and the return data.

15. The non-transitory machine-readable storage medium of claim 14, wherein the instructions upon execution cause the system to output the mock server-side code in a scripting language that is selected by a user of the system.

16. The method of claim 1, wherein generating the mock server-side code comprises:

analyzing, by a system comprising a hardware processor, the request to identify, in the request, an indication of a format of the return data; and including, in the mock server-side code, logic that produces the return data according to the format in response to the mock server-side code receiving the request.

17. The method of claim 16, wherein the saving of the return data stores the return data in a data repository, the method further comprising:

executing the mock server-side code; and during execution of the mock server-side code, receiving, by the mock server-side code, the request, in response to the request, retrieving, by the mock server-side code, the return data from the data repository, and outputting the return data retrieved from the data repository.

18. The system of claim 11, wherein the instructions are executable on the processor to generate the mock server-side code by:

analyzing the request to identify, in the request, an indication of a format of the return data; and including, in the mock server-side code, logic that produces the return data according to the format in response to the mock server-side code receiving the request.

19. The system of claim 18, wherein the saving of the return data stores the return data in a data repository, and wherein the instructions are executable on the processor to:

execute the mock server-side code; and during execution of the mock server-side code, receive, by the mock server-side code, the request, in response to the request, retrieve, by the mock server-side code, the return data from the data repository, and output the return data retrieved from the data repository.

20. The non-transitory machine-readable storage medium of claim 14, wherein the instructions upon execution cause the system to:

identify, based on the information of the user-selected region of the GUI, isolated base web code that is part of a larger base web code, the isolated base web code identified based on location information included in the larger base web code, wherein identifying the isolated scripting code comprises identifying the isolated scripting code that is linked to the isolated base web code.

\* \* \* \* \*